United States Patent
Paganelli

(10) Patent No.: US 8,941,027 B2
(45) Date of Patent: Jan. 27, 2015

(54) LASER MACHINING MACHINE

(75) Inventor: Dino Cataldo Paganelli, Saint Alban de Montbel (FR)

(73) Assignee: Agie Charmilles New Technologies SA, Meyrin (CH)

( * ) Notice: Subject to any disclaimer, the term of this patent is extended or adjusted under 35 U.S.C. 154(b) by 667 days.

(21) Appl. No.: 12/884,438

(22) Filed: Sep. 17, 2010

(65) Prior Publication Data

US 2011/0120981 A1    May 26, 2011

(30) Foreign Application Priority Data

Sep. 25, 2009   (CH) ...................................... 1478/09

(51) Int. Cl.
| | | |
|---|---|---|
| B23K 26/38 | (2014.01) | |
| B23K 26/36 | (2014.01) | |
| B23K 26/08 | (2014.01) | |
| B23K 26/14 | (2014.01) | |
| B23K 26/16 | (2006.01) | |
| B23K 37/02 | (2006.01) | |
| B23K 37/04 | (2006.01) | |
| B23K 37/047 | (2006.01) | |

(52) U.S. Cl.
CPC ........... *B23K 26/365* (2013.01); *B23K 26/0823* (2013.01); *B23K 26/0853* (2013.01); *B23K 26/0869* (2013.01); *B23K 26/147* (2013.01); *B23K 26/16* (2013.01); *B23K 37/0235* (2013.01); *B23K 37/0452* (2013.01); *B23K 37/047* (2013.01)
USPC .................................. 219/121.67; 219/121.78

(58) Field of Classification Search
CPC .. B23K 26/4075; B23K 26/38; B23K 26/123; B23K 2201/40; B23K 26/367
USPC ................... 219/69.11, 69.17, 121.6, 121.67, 219/121.68, 121.69, 121.72, 121.78, 121.8, 219/121.81, 121.82; 700/159–166; 364/474.01, 474.02, 474.08
See application file for complete search history.

(56) References Cited

U.S. PATENT DOCUMENTS

| | | | | |
|---|---|---|---|---|
| 4,578,554 A | * | 3/1986 | Coulter .................... | 219/121.63 |
| 4,720,621 A | * | 1/1988 | Langen ...................... | 219/121.6 |
| 4,733,049 A | * | 3/1988 | Lemelson ................ | 219/121.69 |
| 5,021,632 A | * | 6/1991 | Hauert ..................... | 219/121.83 |
| 5,149,937 A | * | 9/1992 | Babel et al. .............. | 219/121.68 |
| 5,637,245 A | * | 6/1997 | Shelton et al. ........... | 219/121.85 |
| 6,490,499 B1 | * | 12/2002 | Duffin ........................... | 700/166 |
| 6,521,865 B1 | * | 2/2003 | Jones et al. .............. | 219/121.72 |

(Continued)

FOREIGN PATENT DOCUMENTS

JP            09-192870      *  7/1997  ............ B23K 26/14

*Primary Examiner* — Thien S Tran
(74) *Attorney, Agent, or Firm* — Bachman & LaPointe, P.C.

(57) ABSTRACT

A machine for machining workpieces by a laser beam. The optical fiber terminates at an optical output head (27) that defines the optical axis of the laser light beam, which vaporizes the material. The optical output head (27) is rigidly attached to the frame (49) or to the casing of the laser head so that said optical output head remains integrally fastened to said frame or casing during the rotation of the laser head about the horizontal pivot axis (B). The polluted gases generated in the machining area by the evaporation of material are collected by a suction nozzle (37) which is driven with the laser machining head during its rotation about the horizontal axis (B). A stream of clean dry gas is injected into the machining area by an injection nozzle (35) which is also driven with the laser machining head (8) during its rotation about the horizontal axis (B).

15 Claims, 10 Drawing Sheets

(56) References Cited

U.S. PATENT DOCUMENTS

2002/0130116 A1* 9/2002 Lawson ............... 219/121.84
2005/0051523 A1* 3/2005 Legge et al. ............ 219/121.83
2006/0153668 A1* 7/2006 Weick et al. ................ 414/776
2009/0233397 A1* 9/2009 Psyk .............................. 438/68

* cited by examiner

LASER MACHINING MACHINE

BACKGROUND OF THE INVENTION

The present invention relates to a machine for machining workpieces by means of a laser beam. The process, consisting in evaporating material from the surface of a workpiece by means of a focused laser beam, is now very widely used. In this type of machining, the laser beam is reflected by two steering mirrors, which can pivot very rapidly about two perpendicular axes, the rotation of said steering mirrors being controlled by a computer according to a raster lying in a plane. The method is widely used for engraving patterns on plane surfaces. The high-power laser beam is produced by a laser source, at the outlet of which the beam is conducted right to the surface to be treated by means of optical fibres and a series of static or rotary mirrors and other optical components. Most industrial applications are in the field of tooling and the manufacture of moulds in which it is necessary to engrave the surface of certain workpieces with very fine control and precision. Material is removed by sudden heating of the area illuminated by the beam, causing a parcel of material to evaporate. The final diameter of the beam when it reaches the workpiece to be machined is less than 50 µm. The operation takes place in successive layers. The laser beam scans the workpiece within a polygon having dimensions limited to a few centimeters using a scanning device commonly referred to as a galvanometric scanner or "galvo-scanner", consisting of two steering mirrors that can pivot very rapidly about two perpendicular axes. The polygons are defined in such a way that the surface to be treated lies within the focal tolerance of the laser beam when the latter treats the surface of a given polygon, and thus ensures machining uniformity. The two steering mirrors therefore can cover only a limited angular amplitude. The limited scanning amplitude requires the laser head to be periodically repositioned and reoriented about the workpiece to be treated. To treat a workpiece of any 3D geometry, it will be necessary to have available an at least five-axis machine. Furthermore, the machine will incorporate geometric measurement sensors, a touch probe and a camera for example, which are activated so that the laser head is precisely positioned and oriented relative to the workpiece to be machined.

Material removal takes place on all kinds of three-dimensional surfaces, including in concave regions. The method for producing a texture on any 3D surface consists in particular in segmenting the surface into a plurality of restricted partial surfaces within adjacent polygons.

In the thesis entitled *"Near-net-shape laser beam structuring for plastic injection moulds"* presented by Johannes Mario Kordt at the Rheinisch-Westfälische Technische Hochschule Aachen, a similar engraving machine is described in Section 5.1. The machine, based on a five-axis architecture of the MIKRON-HSM 600 U type, was adapted for treating workpieces weighing about 100 kg and having dimensions limited to a volume of 250×250×250 mm³. On one side, the workpiece to be machined is fixed on a worktable that pivots and moves along two perpendicular rotary axes B and C and one linear axis X. On the other side, the laser scanning head is supported by a linear shaft Z, the shaft itself moving along a final linear axis Y. Such a machine structure is not an ideal arrangement for machining heavy workpieces having a mass in excess of 200 kg, because of the flexibility of the cradle. Moreover, the size of the workpieces is limited by the size of the cradle.

SUMMARY OF THE INVENTION

The present invention enables the aforementioned drawbacks to be remedied with an architecture comprising at least three orthogonal linear axes and two mutually perpendicular rotary axes, enabling a laser machining head to be rotated about a horizontal axis and enabling the workpiece to be treated to rotate about a vertical axis. This structure provides a high level of accuracy since there is no variable flexion due to the weight and volume of the moving workpieces, and because the working conditions of the laser machining head remain essentially stationary. It should be noted that the laser source transmits its energy, i.e. the laser light, via an optical fibre unreeled along a cableway terminating at an optical output head defining the optical axis of the laser light beam which, at the end of its path, vaporizes the material. The laser machining machine proposed by the present invention is characterized especially by a particular arrangement of this optical output head that has to be rigidly attached to the frame or to the casing of the laser head and to remain integrally fastened to said frame or casing in order to ensure that the laser light beam is always stable, also during rotation of the laser head about the horizontal pivot axis.

The proposed laser machining head also includes a suction nozzle, for sucking out the polluted gases and dust generated in the machining area by the evaporation of material, this suction nozzle being designed in a novel way in order to follow the rotation of the laser head about its horizontal axis. The machine also includes a blowing nozzle for injecting a stream of clean dry gas into the machining area. This blowing nozzle is also integrally fastened to the laser machining head i.e. it rotates as one with said head when rotating about the horizontal axis.

BRIEF DESCRIPTION OF THE DRAWINGS

Other advantages will be apparent from the features in the dependent claims and from the following description explaining the invention in greater detail, together with the figures in which:

DETAILED DESCRIPTION

Figure 1:
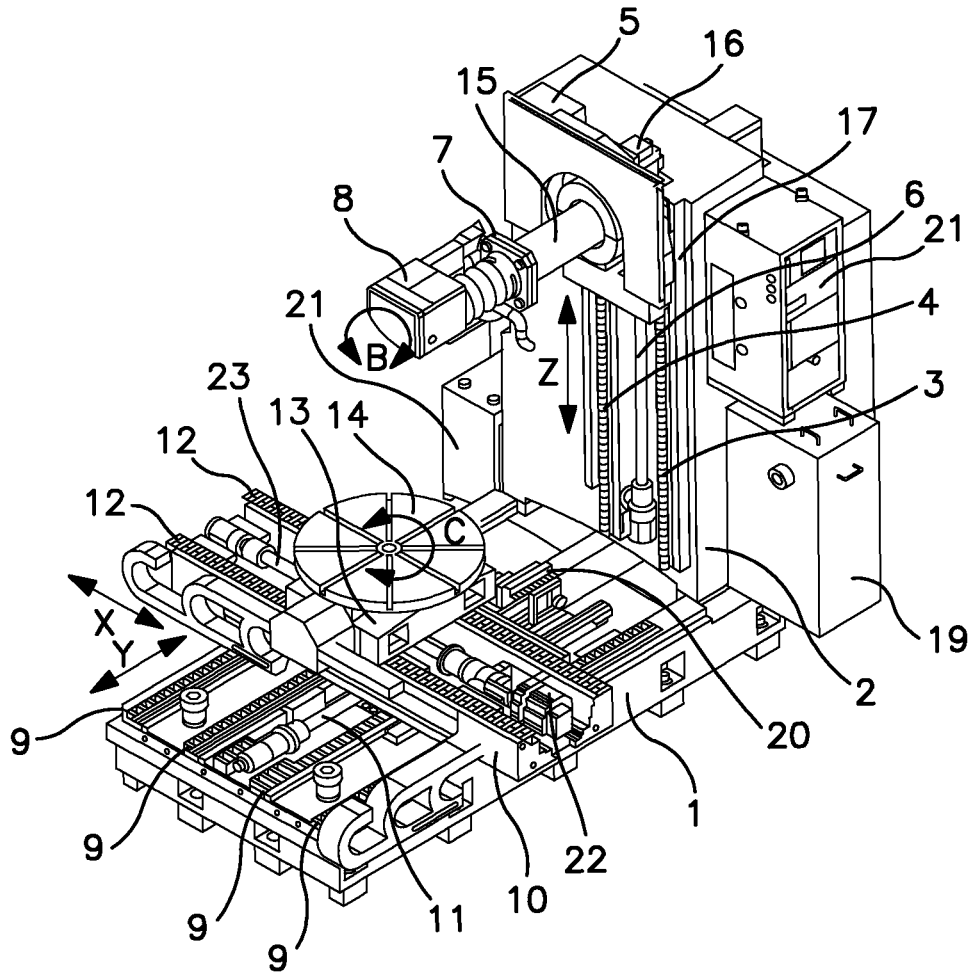
FIG. 1 is a perspective view of the laser machining machine in its entirety. The essential elements are shown in this figure, but without the external bodywork or sheet metal necessary for operator protection.
Figure 2:
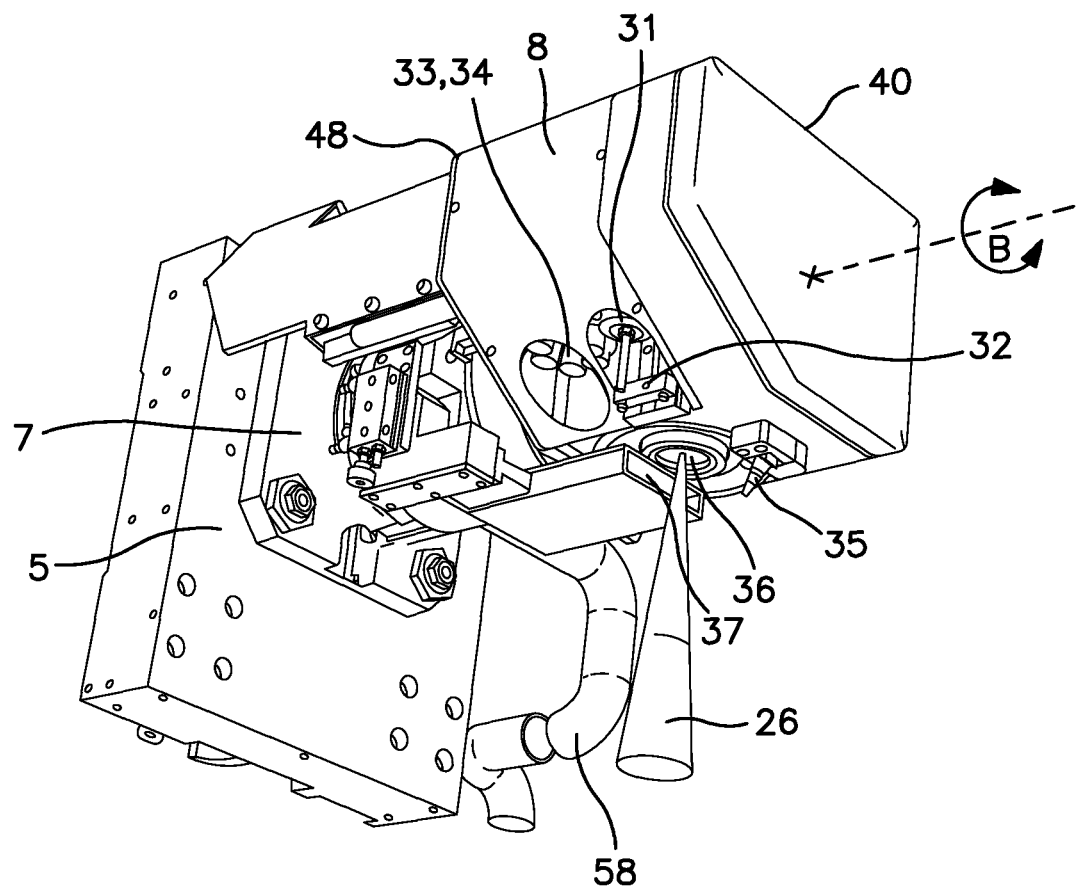
FIG. 2 is a perspective view of the laser head pivoting about the axis B of the machine and connected to a mount moving along the Z axis. In this representation, the laser head is fitted with its metal sheets, casing and/or protective covers.
Figure 3:
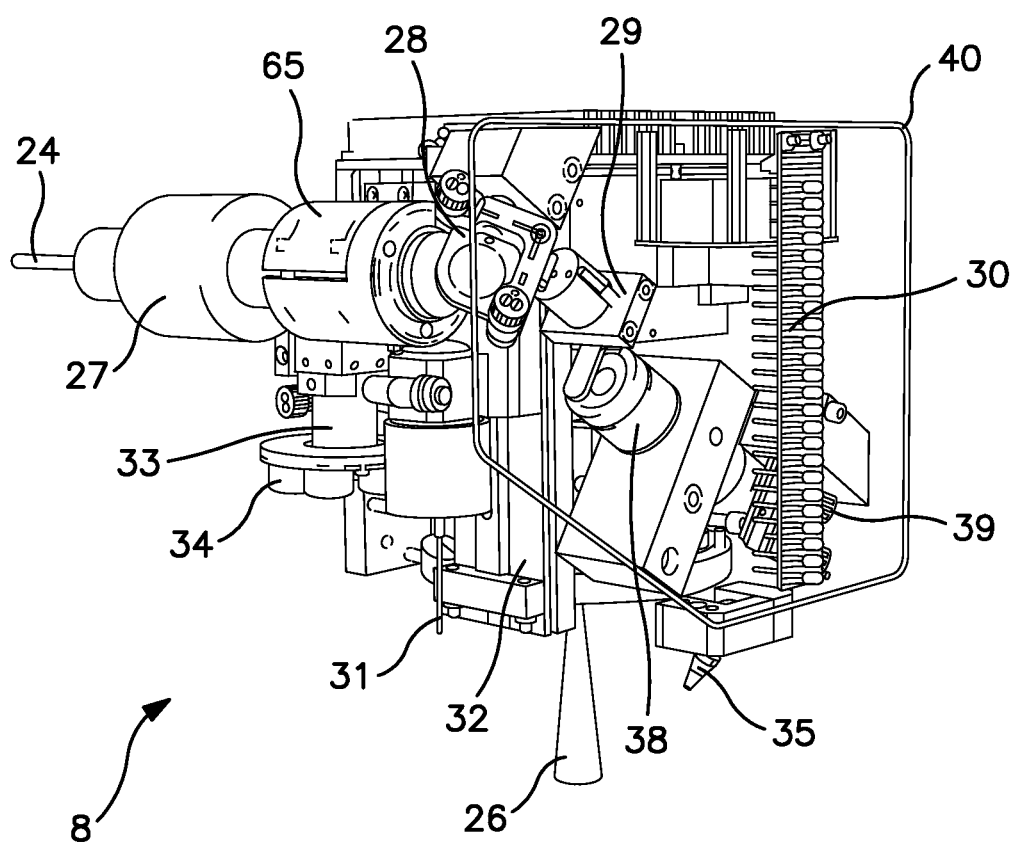
FIG. 3 is a perspective view of the components located inside the laser head. In this representation, the casing and the laser head have been removed. The size of said casing is indicated symbolically by the gasket numbered 40.

The machine tool shown schematically in FIG. 1 is mounted on a very stable frame made up of a broad horizontal base 1 to which a vertical pillar 2 is fixed. On the front face of the pillar 2, two vertical guide rails 3 and 4 guide the movement of a carriage 5 along the vertical axis Z of the machine, the movements of which are brought about the rotation of a screw 6 driven by a servomotor 16. The carriage 5 supports a horizontal barrel 15, the end of which is rigidly connected to a plate 7 for supporting the laser head 8, which is designed to pivot about a horizontal axis B corresponding to the axis of symmetry of the barrel 15 as shown in this figure. However, the horizontal barrel 15 may be omitted in the case of a different arrangement of the linear axes and also on certain machines of smaller size. In the second case, the plate 7 is directly joined to the carriage 5 (FIGS. 2 and 6-9) the pivoting laser head 8 constitutes the essential component of the machine. A high-power laser source 90 (not shown) is installed behind the carriage 5. This laser source 90 generates a laser light beam, which is transported by an optical fibre 24. The latter is unreeled along a cableway system (not shown) as far as the entrance of the laser head 8. At this point, the optical fibre 24 terminates in an optical output head 27 integrally fastened to the laser head 8, as can be seen in FIG. 3. The laser beam, emerging from the optical output head 27, is then deflected by two stationary mirrors 28 and 39 to a galvo-scanner 25 fitted into the laser head 8.

At the end of its travel, the laser beam scans the surface of the workpiece to be treated. As already mentioned, since said scanning is limited to a perimeter of a few centimeters, in order to extend the laser beam's perimeter of action on the workpiece, the rotary and linear axes X Y Z B and C of the machine are used for periodically modifying the relative position of the laser head with respect to the workpiece and to gain access to all regions of the workpiece to be treated.

Mounted on the upper portion of the horizontal base of the frame 1 are four guide rails 9 that support a carriage 10, which moves along a horizontal axis Y, being moved by a screw 11 driven by a servomotor 20. Mounted on the upper portion of the carriage 10 are two other horizontal rails 12 lying perpendicular to the four rails 9. The horizontal rails 12 support a carriage 13 that moves along the X axis of the machine, being moved by a screw 23 driven by a servomotor 22. The carriage 13 supports a table 14 to which the workpiece to be machined is fixed. This table 14 is rotated about a vertical axis C, its drive motor being hidden.

FIG. 1 also shows a compressed-air drying apparatus 21 and another apparatus 19 for the suction and filtering of the air sucked up by the suction nozzle. An apparatus 18 serves to cool the laser source 90 when its power so demands.

It is important to emphasize that the wide horizontal base 1 of the frame, associated with the four guide rails 9, constitutes a very stable structure capable of supporting very heavy workpieces without undergoing excessive flexure, irrespective of the position of the workpiece within the work space XY. In addition, it is advantageous for very heavy workpieces to be rotated about a vertical axis (C) rather than about horizontal axes (A or B). This allows the machine to work with a constant flexural moment and to undergo minimal deformation in its structure. This is why it was decided to construct the laser head, which is a relatively lightweight assembly, around the essential horizontal rotation axis (B) and to incorporate thereinto all the functions necessary for carrying out the laser engraving operations.

With conventional laser machining machines, when a heavy bulky and geometrically complicated workpiece is to be treated, it is therefore necessary not only to pivot the workpiece about a horizontal axis but also to scan it about a horizontal axis. In general such machines have very expensive architectures. For example, to scan the workpiece horizontally requires heavy rigid fastening devices to be incorporated into the work table. A machine that does not scan the workpiece about a horizontal axis, but makes the laser head perform this scan, therefore has certain advantages.

A suitable machine architecture for carrying out the type of machining described above therefore has at least three orthogonal linear axes X Y and Z and two mutually perpendicular rotary axes. This architecture makes it possible to rotate the laser head 8 about a horizontal axis and to rotate the workpiece to be machined about a vertical axis. The two rotary axes are therefore decoupled.

Figure 10:
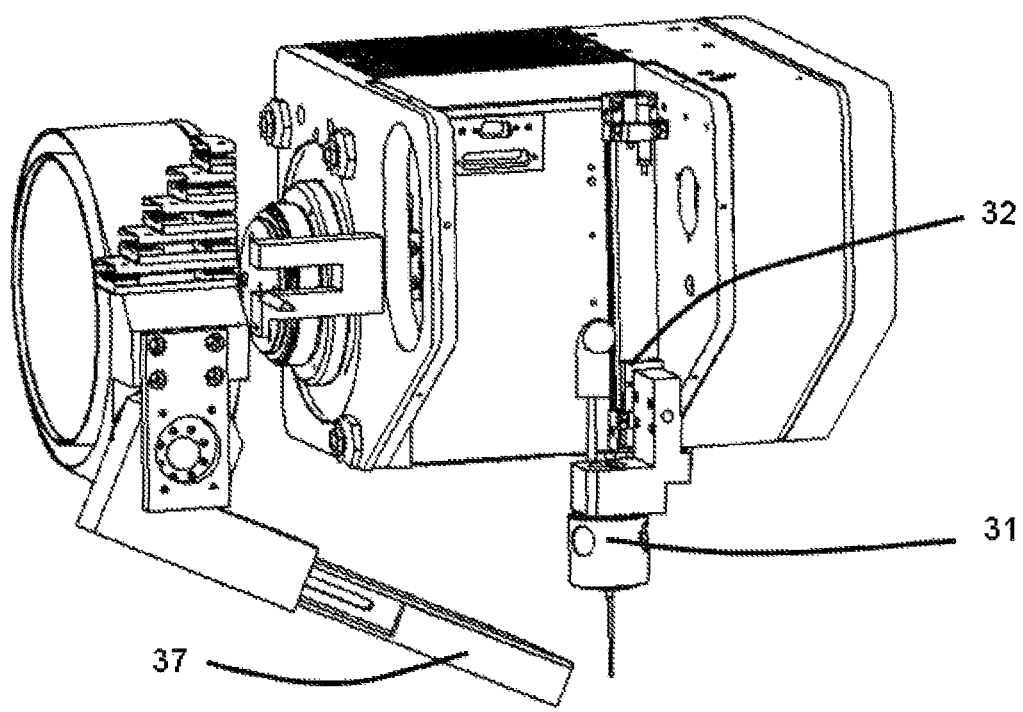
FIG. 10 shows the suction nozzle 37 of the device of the present invention.

However, making such a choice is not trivial since it entails a combination of technical problems: no less than ten essential functions, listed below and required for the process to be carried out correctly, must be incorporated into the rotation of the laser head:

the galvo-scanner 25 placed inside the laser head 8 and controlled by electronic cards placed nearby. These are supplied by a series of electrical cables that have to be conveyed. Transmission of the path files takes place by means of a separate communication cable;

the laser beam travels from the laser source 90 (for example a model YLP-1-120-50-50-HC pulsed fibre laser source from the manufacturer IPG) through an optical fibre 24, reaches an optical output head 27 (FIG. 3), is reflected at 45° by a first fixed mirror 28, passes through a light shutter 29 and an optical beam shaper 38, is reflected at 45° by a second fixed mirror 39, passes through the galvo-scanner 25 (FIG. 4) and then the output lens 36 (FIG. 2) before impacting the surface of the workpiece at 26. It should be pointed out that the fibre 24, only the end of which is shown, is a fragile element having limited flexibility and handling it is tricky when it has to be conveyed via the cableways and incorporated into the rotation B;

the control cable for the shutter 29 and the control cable for the array of diodes 30 which constitutes a luminous warning signal when the laser machining is in action;

the precision electromechanical sensor 31 (for example from Renishaw) necessary for sensing the workpiece before machining, so as to position and orient the laser head 8 with respect to the workpiece. This function includes at least two connecting cables: one for transmitting the measurement signal and the other for controlling the retractable carriage 32 on which the electromechanical sensor 31 is mounted, see FIG. 10. This sensor is in the retracted position inside its housing when it is not in operation and emerges through the action of an air cylinder actuator when a measurement has to be performed;

the CCD camera 33 which is used for precisely positioning and orienting the laser head 8 with respect to the workpiece to be machined. It comprises a connection cable for transmitting the images and a cable for supplying the ring of light-emitting diodes 34 placed around the exit lens of the camera;

an orientable blowing nozzle 35 placed close to the exit lens 36 of the galvo-scanner. This nozzle serves to blow away all the impurities resulting from the machining and to keep the atmosphere beneath the lens clean. This nozzle 35 is supplied via a relatively rigid hose that must also undergo the rotation B and generates mechanical stresses that are not negligible;

as shown in FIG. 10, the suction nozzle 37, which is telescopic, orientable and retractable, and also placed as close as possible to the exit lens 36 of the galvo-scanner, cooperates with the blowing nozzle 35. This nozzle, like the suction nozzle 37, can be adjusted about an axis perpendicular to the pivot axis B of the laser machining head 8. The blowing nozzle 35 is firstly directed towards the machining area and then opposite the suction nozzle 37 so that the stream of clean gas polluted by the dust coming from the machining area is entirely collected by the suction nozzle 37. This nozzle must evacuate a large volume of low-pressure polluted air and therefore the cross sections of the ducts are relatively large, hence causing a space problem. In order for these ducts to be optimally integrated with the movements of the laser head 8, they must be rigid and include rotary seals that introduce friction torques and generate local stresses that run the risk of being transmitted to the laser head and therefore of spoiling its positioning accuracy;

the case 40 of the laser head 8 is a sealed chamber pressurized using a conduit that transports dry filtered air stripped of any oil vapour. A pressure sensor may form part of this function and must also be supplied via a dedicated cable;

an anti-collision safety system, comprising two sub-functions, as detailed below, incorporates several microswitches for stopping the machine in the event of an accidental collision and for which the connection cables must be conveyed. An impact measurement sensor informs the machine in the event of a collision.

The need to incorporate a large number of functions in the pivoting laser head 8 involves redesigning the construction of the devices for load transmission, for guiding and for transporting this profusion of electrical connections, hoses, optical waveguides or the like, which devices are dedicated to each of these functions. The installation comprises more than a hundred components of such types. The greater the amplitude of rotation about the B axis (for example more than 220°), the higher the torsional stresses generated by said components. The point of impact of the laser beam may be deflected by several μm. One of the major difficulties therefore consists in ensuring accuracy of the optical axis in all positions of the laser head 8. This objective is achieved mainly by rigidly fixing the optical output head 27, located at the end of the fibre 24, to the frame of the laser head 8 by means of a clamp 65 (FIG. 3). Since the laser head 8 is free of the mechanical stresses induced by the large number of cables connected to the head during its movements, thanks to the tensile and torsional strain relief system (see below) the optical axis defined by the alignment of the optical output head 27 remains steady.

In FIGS. 2, 3, 4 and 5 the essential functions located at the rear of the laser head 8 cannot be clearly distinguished. This is the case in particular for certain elements incorporated into the rotation B and moved by the mounting plate 48, which can be seen in FIGS. 5, 6, 7 and 8. Secured to this mounting plate 48 are, in particular, the following devices, already mentioned above:

the suction system with its suction nozzle 37 and its ducts 55, 56, 58 for evacuating the polluted air by means of mutually coaxial tubes fitted with rotary seals 57;

the tensile and torsional strain relief device, i.e. the system for attaching and driving the series of cables and other connections, hoses, optical fibres, etc. which are grouped together and clamped in a series of glands 46 before penetrating the sealed chamber 40 of the laser head 8;

the anti-collision system of the laser head, intended to protect the fragile parts inside the chamber 40. This device may be understood from FIGS. 4 and 5; and the anti-collision system of the suction nozzle 37, the operation of which may be explained with the aid of FIG. 8.

FIGS. 6, 7, 8 and 9 serve to describe the operation of the system for holding and rotating the series of cables and other connection elements necessary for operating the laser head 8. The mounting plate 48 is rigidly fixed to a shaft 41, which is coaxial with the rotation axis B. That face of the shaft 41 that bears against the mounting plate 48 can only be seen in FIG. 9. This shaft 41 is rotated by a servomotor, the stator of which is secured to the z-axis carriage 5. A ring 42 is coupled so as to rotate freely about said shaft 41 by means of a needle bearing (not shown). One of the faces 43 of the ring 42 bears against a circular shoulder 44, which is itself rigidly secured to the shaft 41. Therefore, the ring 42 is free to rotate about the shaft 41, but receives no torque caused by this shaft. The ring 42 is extended by an arm 59 in the form of a bracket, which supports, at its end 45, a series of glands 46. The latter element 46 collects and holds tight together the packet of cables and other connection members necessary for the essential functions incorporated into the rotation B. The bracket 59 is held captive, with a certain play, inside a fork 47, which is itself rigidly attached to the mounting plate 48, so that the fork 47 essentially transmits a force in the plane of the mounting plate 48, resulting in a moment at the axis of the shaft 41. The torque delivered by the servomotor and intended to drive the glands 46 is transmitted to the bracket 59 via the mounting plate 48 and then via the fork 47. Since the bracket 59 is mounted loosely relative to the shaft 41 via the ring 42, the undesirable torsional stresses caused by the packet of connection members are recovered by the shaft 41 via the ring 42 and are therefore not transmitted to the laser head by the connection members. This shaft 41 is sufficiently rigid that it undergoes only negligible flexure. In other words, the undesirable forces are taken out on the drive shaft 41 through a succession of virtually undeformable mechanical elements.

Such a drive system illustrated by FIGS. 6, 7, 8 and 9 advantageously frees the laser head of the undesirable forces due to the packet of rotating connection members and jerks that are caused by reversals of direction, thus guaranteeing exceptional repositioning accuracy.

Figure 4:
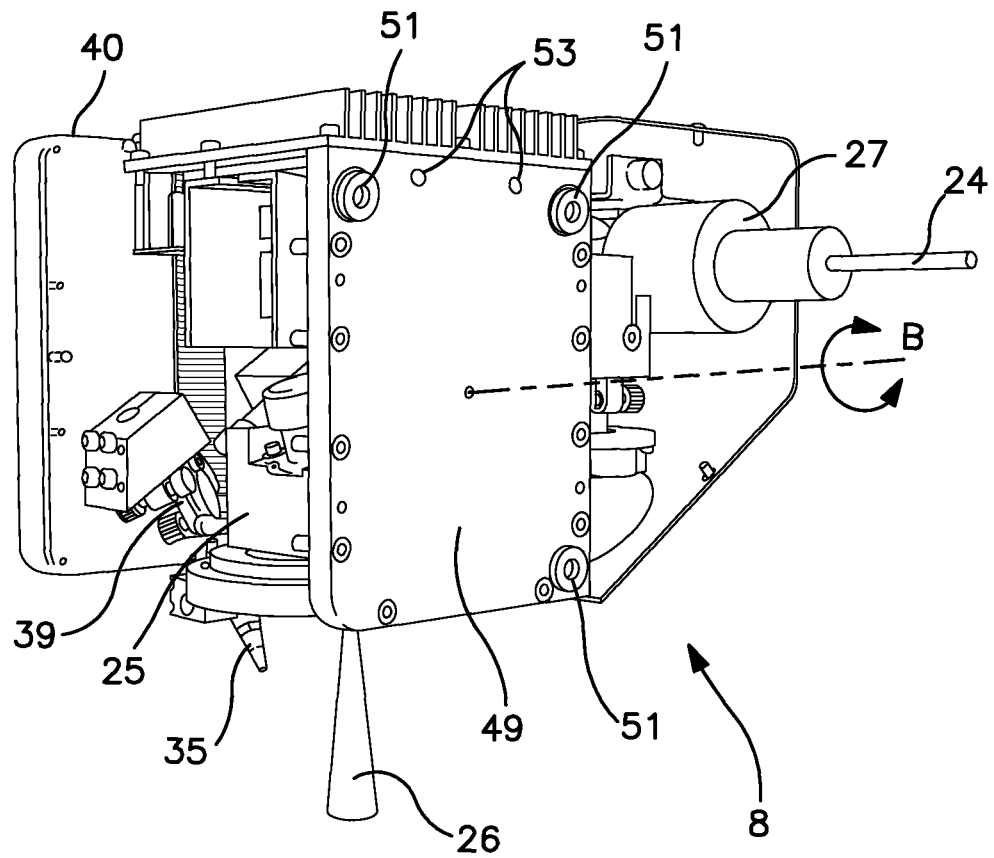
FIG. 4 is a perspective view of the laser head seen from the rear, with its casing partially open.
Figure 5:
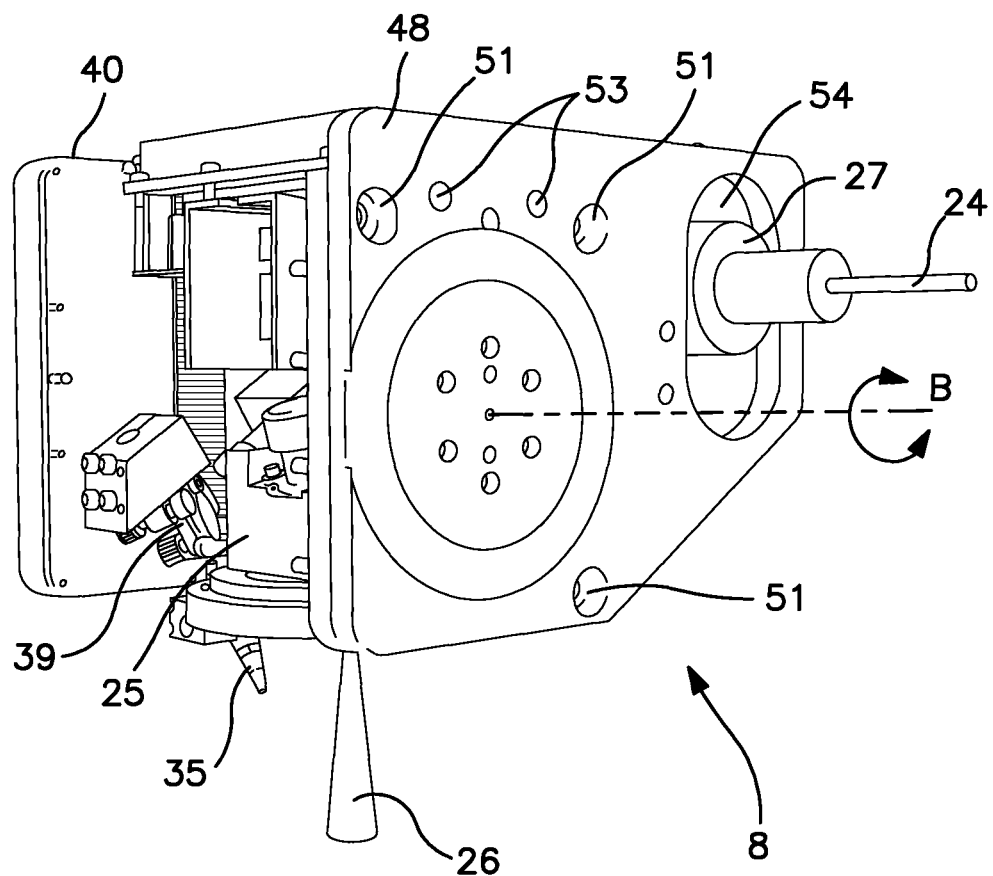
FIG. 5 is similar to FIG. 4, but introduces the element that serves to support and rotate the laser machining head.
Figure 6:
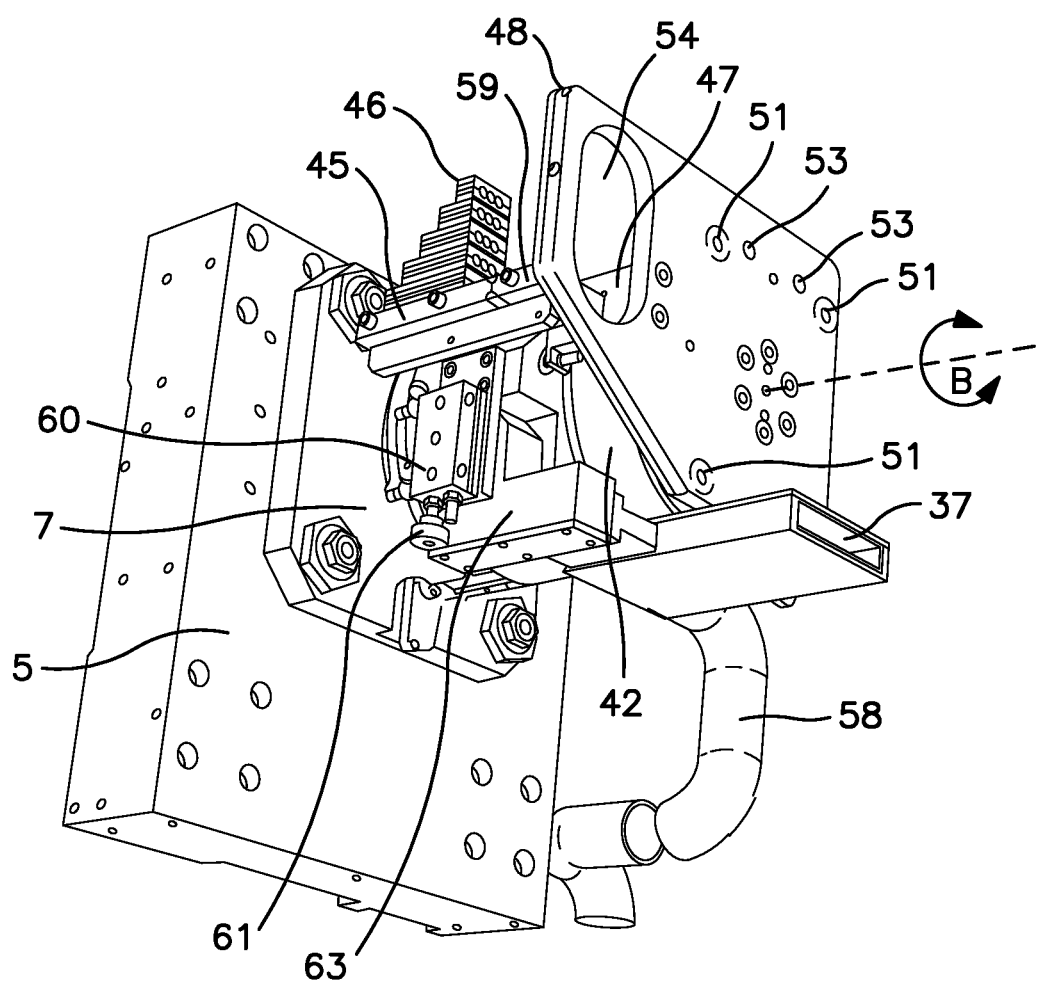
FIG. 6 is a perspective view of the devices for attaching the laser head to the structure of the machine, the tensile and torsional strain relief device and the polluted-air suction device. In this representation, the laser head as visible in FIGS. 3, 4 and 5 has been removed.
Figure 7:
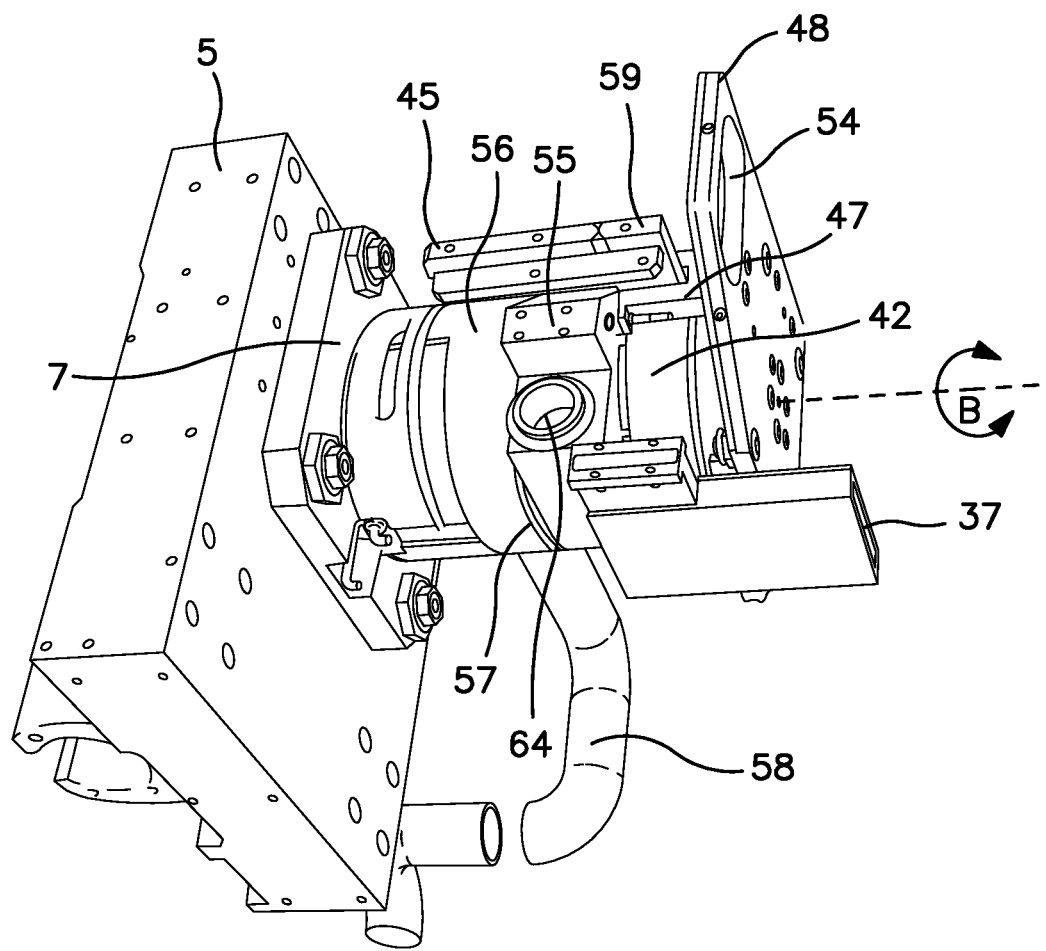
FIGS. 7, 8 and 9 are variants of FIG. 6 at different viewing angles.

FIGS. 4 and 5 illustrate the anti-collision system of the laser head. These two figures are almost identical apart from the fact that in FIG. 4 the mounting plate 48 has been removed so as to explain the fastening interface between the face 49, an integral part of the laser head 8 and constituting the frame thereof, and the mounting plate 48 that supports it and transmits the torque thereto. The laser head 8 is held pressed against the mounting plate 48 via the face 49 of its frame and is rigidly rotated by said mounting plate by means of three bolts (not shown). These bolts are designed to have a limited resistance to shear forces and are capable of yielding under excessive shock. The drill holes or tappings intended to receive these bolts have the numbers 51 in FIGS. 4 and 5. If said bolts yield, provision is nevertheless made for the laser head 8 to be retained by means of two shouldered safety bolts (not shown) that pass through the mounting plate 48 and the face 49 via holes 53. A clearance of a few mm is provided between shouldered bolts and holes. Should the laser head drop as a result of the bolts fracturing, the optical output head 27, where the fibre 24 connected to the laser head 8 terminates, will not be sheared by the mounting plate 48 because of the wide recess 54 made in the mounting plate 48 around the output head 27. Such an arrangement serves to protect the fragile components of the laser head. It is therefore worthwhile pointing out that, despite the great complexity of the functions incorporated into its rotation, the laser head is protected from collisions.

Figure 8:
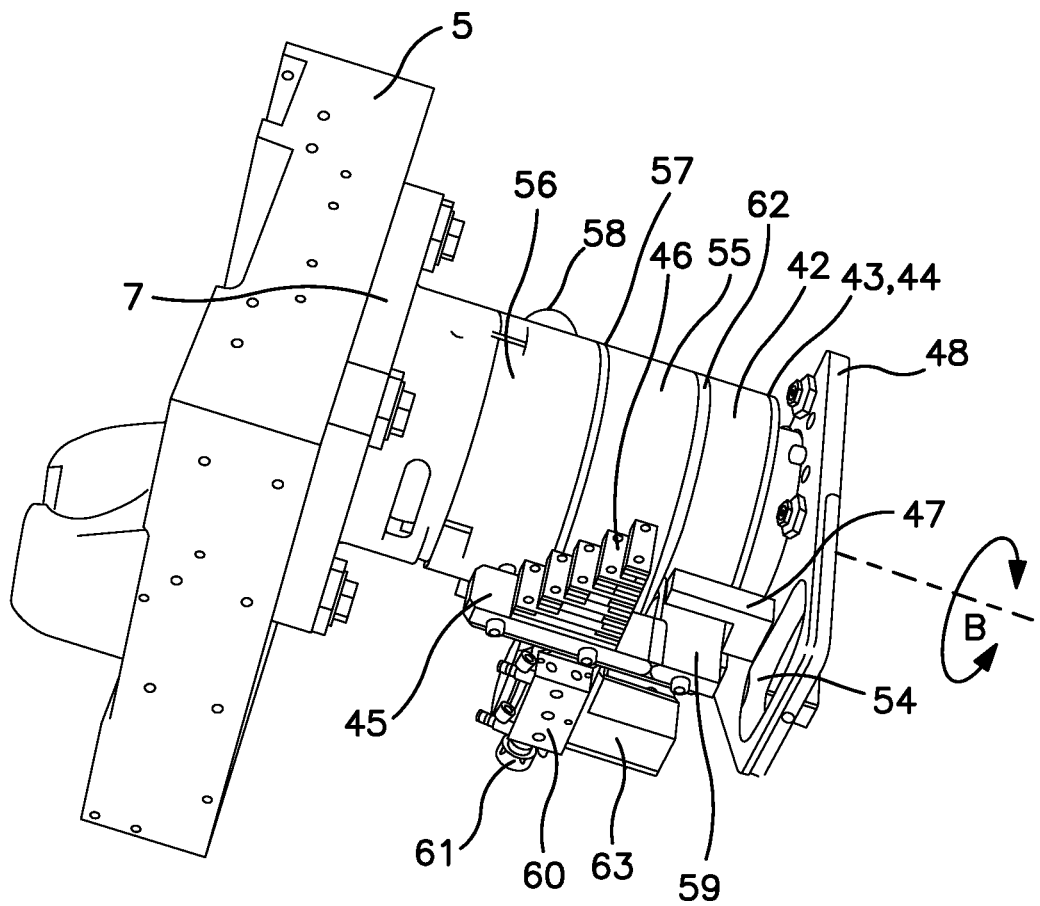
Figure 9:
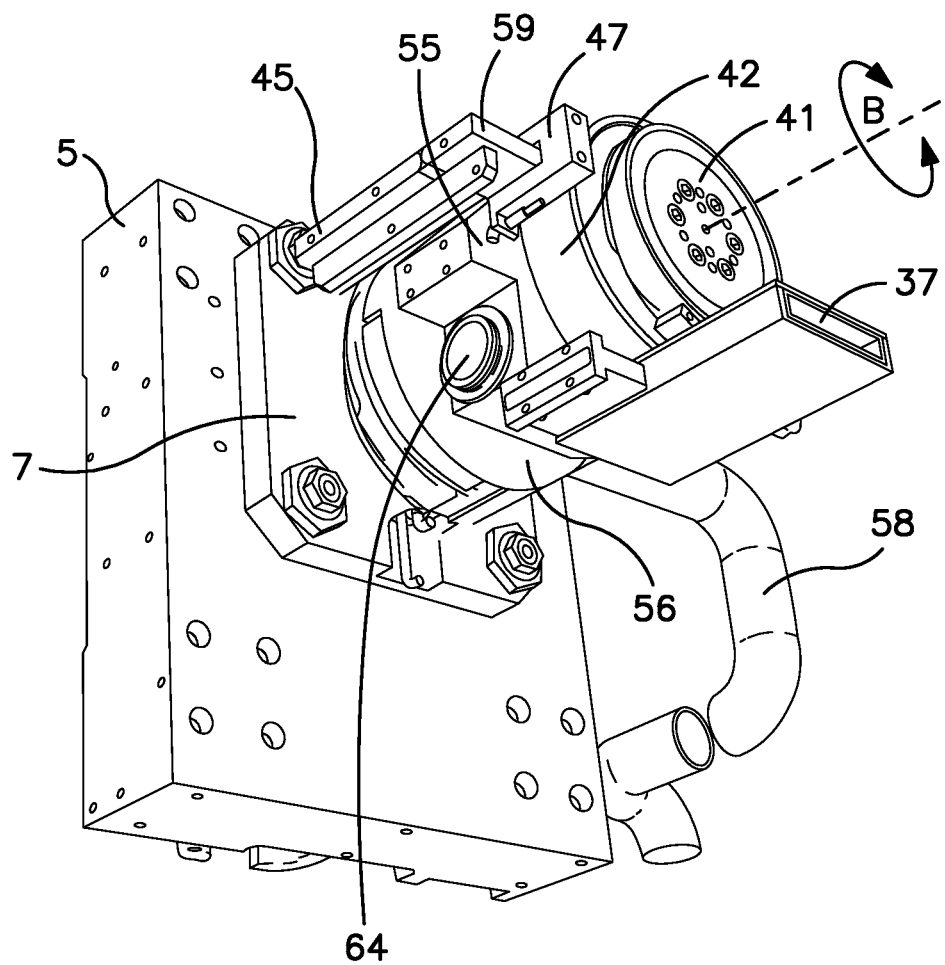

FIGS. 6, 7, 8 and 9 illustrate in detail the system for evacuating the air polluted by the laser machining and its anti-collision device. The suction nozzle 37 is telescopic, that is to say the length of its spout can be adjusted. It can also be adjusted angularly using a rotary air cylinder actuator 60 that includes a mechanical stop which is manually adjusted using the rotary knob 61. The suction nozzle 37 is also retractable—it can be retracted into the folded position during positioning operations in order to avoid collisions. This suction nozzle 37 is connected to a wide annular duct 55 formed by two coaxial cylinders, one inside the other, which are fitted around the shaft 41. To pass from the suction nozzle 37 to the annular duct 55, the polluted air must pass through an intermediate conduit 63 that can be seen in FIGS. 6 and 8. This intermediate conduit 63 has been removed in FIGS. 7 and 9 in order to show the cylindrical orifice 64 via which the polluted air penetrates the annular duct 55. The axis of the cylindrical orifice 64 constitutes the pivot axis of the suction nozzle 37. This axis is perpendicular to the rotation axis B of the laser head. The nozzle 37, fixed to the annular duct 55 via the element 63, is rotated about B by means of the ring 42 already described above. The annular duct 55 and the ring 42 are connected together on the periphery by a series of mechanical drive parts (not shown) located in the interface 62 (FIG. 8). These mechanical parts transmit, in a conventional manner, the torque transmitted from the rotating element 42 to the rotating element 55, thus enabling the element 62 to be sheared (thus serving as a mechanical fuse) if a collision occurs at the suction nozzle 37. In the event of shear, an element (not shown) of the rotary air cylinder actuator 60 butts against, or pulls on, the end 45 of the arm 59 and trips a safety microswitch (not shown), stopping the machine. The rotary annular duct 55 opens into another, stationary annular duct 56, also located around the shaft 41. The annular duct 56 has the same cross section and same geometry as the annular duct 55, constituting the extension thereof, this annular duct 56 is secured to the Z-axis carriage. A set of O-rings 57 seals the sliding interfaces 55/56. A tube 58 collects the polluted air emanating with a considerable flow rate from the annular duct 56, sending it to a filtering station 19.

It is important for the polluted gases and the dust generated to be effectively removed from the machining area so that the maximum amount of energy of the laser light beam 26 reaches the surface of the workpiece to be treated.

For this purpose, the orientable blowing nozzle 35 is opposite the telescopic, orientable and retractable suction nozzle 37. The blowing nozzle 35 is oriented in accordance with the shape of the workpiece to be machined, so as to direct the flow of clean gas onto the machining area. The flow of polluted gas and dust coming from the machining area is collected by said suction nozzle 37, which is also steered according to the shape of the workpiece to be machined. In addition, the suction nozzle 37 is telescopic, and thus designed to come as close as possible to the surface to be treated in order to collect the flow of polluted gas and dust in the immediate vicinity of the emission point, even when the focal distance is considerable.

When the laser head 8 is being rotated about the horizontal pivot axis B, the blowing nozzle 35 and the suction nozzle 37 are driven so that an intense stream of gas flows continually in the area close to the surface.

The machine, intended for machining any three-dimensional workpiece by means of a focused laser light beam according to the present invention, is preferably produced in accordance with the above description. However, alternative versions may clearly provide benefits in certain cases.

The carriages 10 and 13 illustrated in FIG. 1 constitute a YX cross-table that supports the table 14 to which the workpiece to be machined is fixed. It is also conceivable to have a different arrangement of the linear axes: in particular it may be beneficial to bring all the translational movements to the side of the tool so that the workpiece to be machined undergoes only a rotation about a vertical axis. Moreover, it may be advantageous to decouple the X and Y axes, for example so that the table 14 is supported only by a Y-axis carriage and the vertical pillar 2 is supported by an X-axis carriage.

Although it is advantageous to design the polluted-air evacuation duct by means of rigid ducts connected via rotary seals, as described above, this evacuation duct may be formed at least partially from a flexible hose and driven, on the one hand, by the mounting plate 48 and, on the other hand, by the Z-axis carriage 5. In this version, an extension of that part of the flexible hose driven by the mounting plate 48 is connected to the cylindrical orifice 64, for example via a rotary seal.

In an alternative version of the tensile and torsional strain relief device, the bracket 59 is held captive inside the fork 47, the space between the fork and the bracket being filled with an elastic damping material in order to avoid any discontinuity in transmitting the forces.

In a simplified version of a tensile strain relief device, the glands 46 are mounted directly on the mounting plate 48.

It is obvious that a person skilled in the art may produce other versions without thereby departing from the scope of the invention.

The invention claimed is:

1. Machine for machining any three-dimensional workpiece by means of a focused laser light beam that causes a parcel of material to be locally evaporated at a surface of the workpiece to be treated so as to engrave the surface of the workpiece, the machine comprising:
   three orthogonal linear axes (X, Y, Z) and two mutually perpendicular rotary axes (B, C), and means for rotating a laser machining head (8) about the axis (B) which is horizontal and to rotate a workpiece to be treated about the axis (C) which is vertical;
   a laser light beam (26) being reflected at an exit of the laser machining head (8) by a galvo-scanner (25) consisting of two steering mirrors which are pivotable about two perpendicular axes, wherein the laser light beam (26) being produced by a laser source (90);
   the laser source transmits energy to the laser machining head via an optical fibre (24) that is unreeled along a cableway system;
   the optical fibre terminates at an optical output head (27) which defines an optical axis of the laser light beam;
   the laser machining head (8) comprises a frame (49) and a casing, wherein the laser machining head (8) is selectively repositioned and re-steered to direct the laser light beam on different areas of the workpiece to be treated;
   the optical output head (27) is rigidly attached to the frame (49) or to the casing of the laser machining head so that the optical output head remains integrally fastened to the frame or casing during rotation of the laser head about the horizontal axis (B);
   a suction nozzle (37) which is integrated into and rotates with the laser machining head during the rotation of the laser machining head about the horizontal axis (B) collects polluted gases generated in a machining area by evaporation of material;
   a blowing nozzle (35) which is integrated into and rotates with the laser machining head (8) during the rotation of the laser machining head about the horizontal axis (B) injects a stream of clean dry gas into the machining area; and
   wherein the laser machining head (8) is provided with a tensile and torsional strain relief device (41, 42, 59) for relieving the laser machining head (8) of mechanical stresses induced by connected cables.

2. Machine according to claim 1, wherein a touch probe (31) and/or a CCD camera (33) are driven with the laser machining head (8) during the rotation of the laser machining head about the horizontal axis (B).

3. Machine according to claim 1, wherein the laser machining head (8) is equipped with a mechanical device to protect components in the event of an accidental collision, the device comprises fastening bolts designed to yield under an excessive shear force.

4. Machine according to claim 1, wherein the tensile and torsional strain relief device relieves the laser machining head of undesirable forces caused by the profusion of electrical connections, hoses, optical waveguides conveyed via the cableway terminating in a series of glands (46), the relief device being formed by means of a fork (47) that rotates the glands (46) fixed to a loose bracket (59), the fork (47) being coupled, with play, on one side to the loose bracket (59) and on the other side rigidly attached to a mounting plate (48) for supporting the laser machining head (8), said mounting plate (48) being secured to a rotation drive shaft (41) wherein undesirable forces are taken up on the drive shaft (41) through a succession of virtually undeformable mechanical elements.

5. Machine according to claim 1, wherein the suction nozzle (37) to collect the polluted gases is adjustable and rotates about the axis (C) perpendicular to the pivot axis (B) of the laser machining head (8).

6. Machine according to claim 5, wherein the length of the suction nozzle (37) is adjustable.

7. Machine according to claim 5, wherein the suction nozzle (37) is equipped with a microswitch which stops the machine in the event of a collision.

8. Machine according to claim 1, wherein the blowing nozzle (35) is adjustable and can rotate about the axis (C) perpendicular to the pivot axis (B) of the laser machining head (8).

9. Machine according to any one of claims 5, 6 and 8, wherein the blowing nozzle (35) is directed towards the machining area and is opposite the suction nozzle (37) so that a stream of clean gas polluted by dust coming from the machining area is collected by the suction nozzle (37).

10. Machine according to claim 2, wherein a touch probe (31) is mounted on a retractable carriage (32) and is deployed through the action of a cylinder actuator when a measurement is to be performed.

11. Machine according to claim 1, wherein the tensile and torsional strain relief device mounts the connected cables with play about the horizontal axis (B) relative to the frame of the laser machining head.

12. Machine according to claim 11, wherein a shaft (41) is coaxial with the horizontal axis (B).

13. Machine according to claim 11, wherein, said mechanical stresses include tensile and torsional stresses.

14. Machine according to claim 1, wherein a shaft (41) is along the horizontal axis (B).

15. Machine according to claim 1, wherein the optical output head is offset from the horizontal axis (B).

* * * * *